May 17, 1966 D. L. JENSEN 3,251,581
CONTAINER STIRRING APPARATUS
Filed May 6, 1964 2 Sheets-Sheet 1

Douglas L. Jensen
INVENTOR.

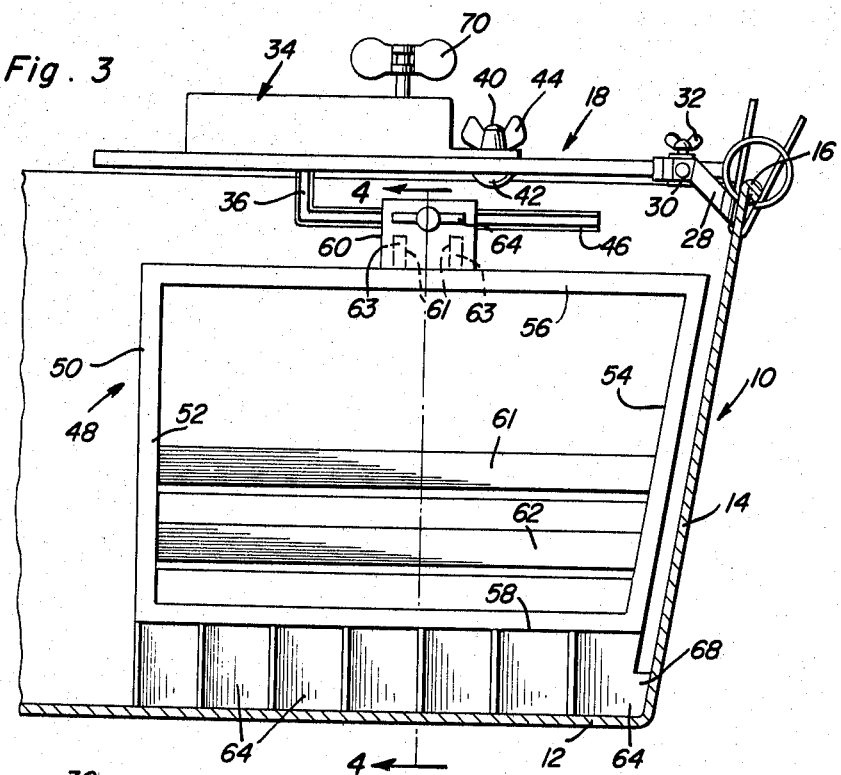
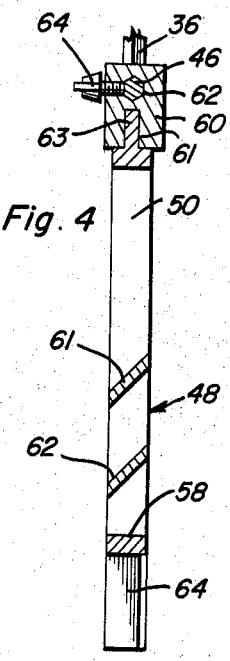
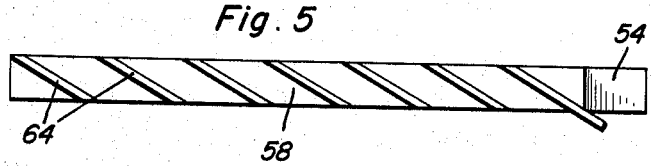

United States Patent Office 3,251,581
Patented May 17, 1966

3,251,581
CONTAINER STIRRING APPARATUS
Douglas L. Jensen, P.O. Box 112, Apple Valley, Calif.
Filed May 6, 1964, Ser. No. 365,376
8 Claims. (Cl. 259—108)

This invention relates to a novel and useful apparatus designed primarily for the purpose of providing a means whereby a portable mixer may be readily removably supported from a cooking container such as a pot or pan or the like and utilized to stir the contents of the pan while the cook performs other cooking tasks, related or unrelated.

The container stirring apparatus is constructed in a manner whereby it may be secured to numerous types of cooking vessels such as pots, pans, bowls, etc. and includes a motor driven shaft from which a blade-like mixer assembly may be supported in depending relation so as to position the mixer assembly slightly vertically spaced above the bottom of the associated cooking vessel or container so as to stir the contents of the container upon rotation of the motor-driven shaft.

The stirring apparatus of the instant invention includes an elongated mounting arm having means at one end adapted to clampingly engage and to be supported from one lip or upper portion of a cooking vessel with the other end portion of the mounting arm projecting radially inwardly of the cooking vessel in vertically spaced relation relative to the bottom thereof and a motor is supported from the support arm for longitudinal positioning therealong and includes a depending drive shaft to which the mixer assembly may be adjustably secured. In this manner, the stirring apparatus may be adjusted so as to readily conform to the contour of various types and sizes of cooking vessels. Still further, the mixer assembly is removably supported on the drive or driven shaft of the motor thereby enabling other panel or blade-like mixing assemblies or the like to be utilized for performing a specific function.

The main object of this invention is to provide a container stirring apparatus of the type hereinbefore set forth constructed in a manner whereby the apparatus may be readily mounted upon the upper portion of substantially all types of cooking vessels with the support arm of the apparatus extending generally radially of the cooking vessel thereby enabling the motor supported therefrom and the associated driven or drive shaft which is to drive the mixer assembly to be adjusted radially of the cooking vessel with which the container stirring apparatus is operatively associated.

Another object of this invention, in accordance with the immediately preceding object, is to provide a container stirring apparatus including means for removably attaching the apparatus to an associated cooking vessel which may be readily actuated to quickly mount the apparatus on an associated cooking vessel or to release the stirring apparatus from an associated cooking vessel.

Still another object of this invention is to provide a stirring apparatus whose motor is spring-driven thereby enabling the apparatus to be highly portable and utilized in conjunction with a cooking vessel disposed on a stove burner without danger of the heat of the stove burner causing an electrical cord such as that which is normally provided for operation of conventional mixers to become ignited.

A further object of this invention, in accordance with the preceding objects, is to provide a stirring apparatus constructed in a manner whereby the associated cooking vessel may be readily transferred from one location to another without the stirring apparatus causing any particular problem during transit of the associated cooking vessel.

A final object of this invention to be specifically enumerated herein is to provide a stirring apparatus in accordance with the preceding objects which will conform to conventional forms of manufacture, be of simple construction and easy to use so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary vertical sectional view of the embodiment illustrated in FIGURE 1 taken substantially upon a plane passing immediately to one side of the stirring apparatus and through the approximate center of the associated cooking vessel;

FIGURE 4 is an enlarged fragmentary vertical sectional view taken substantially upon the plane indicated by the sectional line 4—4 of FIGURE 3; and FIGURE 5 is a bottom plan view of the mixer blade assembly of the stirring apparatus.

Figure 1:
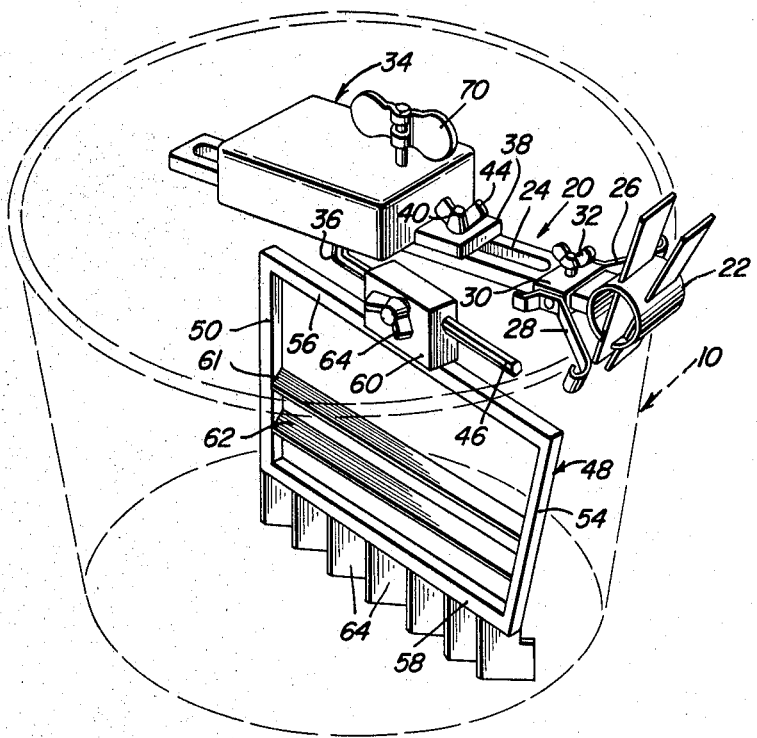
FIGURE 1 is a perspective view of the stirring apparatus of the instant invention shown operatively positioned on a conventional type of cooking vessel which is illustrated in phantom lines.
Figure 2:
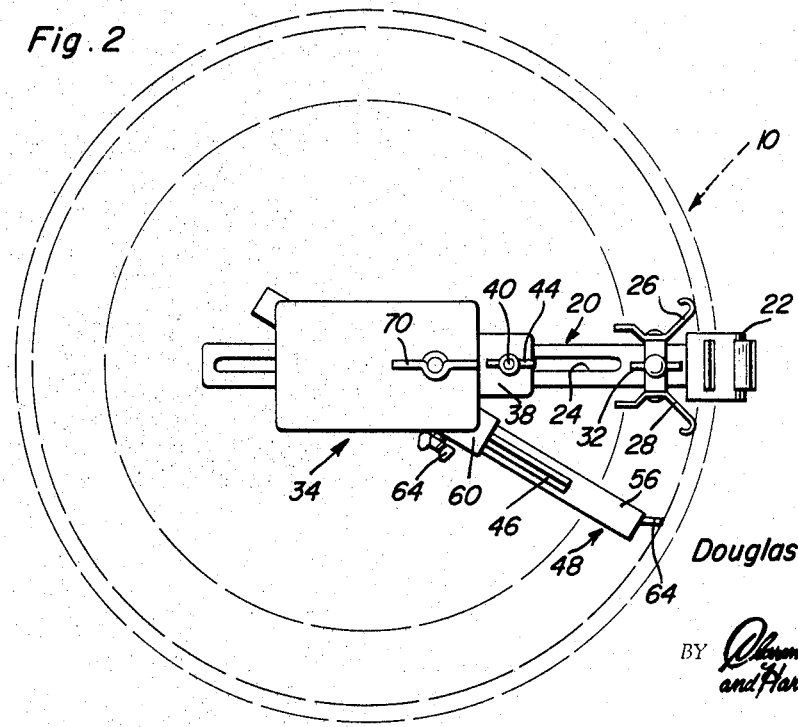
FIGURE 2 is a top plan view of the embodiment illustrated in FIGURE 1.

Referring now more specifically to the drawings the numeral 10 generally designates a conventional form of cooking vessel in the form of a pan and which includes a substantially flat bottom wall 12 and generally cylindrical side walls 14 which include a reinforcing bead 16 at their upper ends.

The stirring apparatus of the instant invention is generally designated by the reference numeral 18 and includes a elongated support arm generally referred to by the reference numeral 20 including a clamp assembly 22 on one end portion and having a longitudinal upstanding slot 24 formed therein. The clamp assembly 22 is utilized to clampingly engage an upper portion of the cylindrical walls 14 of the vessel 10 and a pair of bracing legs 26 and 28 are carried by a mounting sleeve 30 slidably disposed on the support arm 24. The sleeve 30 may be retained in adjusted positions by means of a setscrew 32 and the legs 26 and 28 are utilized to brace the support arm 20, the latter being generally horizontally disposed and extending radially of the vessel 10.

A motor assembly generally referred to by the reference numeral 34 including a depending drive or driven shaft 36 is also slidably mounted on the support arm 20 and includes an apertured mounting lug portion 38 which is in registry with the slot 24 and has a fastener 40 secured therethrough, the fastener 40 also passing through the slot 24 and having a head 42 on its lower end and a retaining element 44 threadedly engaged with the upper end thereof projecting through the apertured mounting lug 38.

The lower end portion of the drive shaft 36 includes a laterally directed and substantially horizontally disposed arm portion 46 which is substantially hexagonal in cross-section as shown in FIGURES 1 and 4 of the drawings.

A mixing blade or paddle assembly generally referred to by the reference numeral 48 is provided and includes an upstanding generally rectangular open frame 50 having upstanding members 52 and 54 interconnected by means of upper and lower horizontal members 56 and 58.

A mounting block 60 having a pair of downwardly opening blind bores 61 formed therein is mounted on the upper horizontal member 56 by means of a pair of upstanding pegs 63 carried by the member 56 and snugly and removably received in the bores 61. The block 60 also has a horizontal hexagonal bore 62 formed therethrough which generally parallels the medial plane of the frame 50. A setscrew 64 is operatively associated with the bore 62 and may be utilized to secure the mounting block or slide 60 in adjusted position lingitudinally along the laterally directed and horizontally disposed portion 46 of the drive shaft 36.

A plurality of vertically spaced and generally horizontally disposed mixing blades or vanes 61 and 62 are also secured between the upright members 52 and 54 and a plurality of depending bottom scraping blade elements 64 are supported from the undersurface of the lower horizontal member 58. The elements 64 are constructed of stiff but resilient material and are spaced longitudinally of the lower horizontal member 58 and angularly disposed relative thereto. The elements 64 generally parallel each other and it may be noted that the mixing blades or vanes 61 and 62 may also be constructed of stiff and rigid material if desired. However, in both instances the mixing blades are vanes 61 and 62 will be constructed of substantially stiff material.

The outermost element 64 includes an enlarged portion 68 which projects outwardly beyond the outer edge portion of the frame 48 and thereby maintains the latter in spaced relation relative to the cylindrical side walls 14 of the vessel 10.

It may be noted that the motor assembly 34 is of the spring-actuated type and that it includes a key 70 for winding the spring after it has been unwound. Inasmuch as the motor 34 is spring-operated, the stirring apparatus 18 may be readily transported or transferred from one location to another on the associated vessel 10 without interference from electrical cords.

Inasmuch as the motor assembly 34 may be adjusted longitudinally of the support arm 20 and the mounting block 60 may be adjusted longitudinally of the laterally directed portion 46 of the drive shaft 36, it may be seen that the blade assembly 48 may be readily adjusted relative to the side walls 14 of the vessel 10 so as to more readily conform to its size and shape. Further, the motor assembly 34 may also be electrically actuated and include its own rechargeable or replaceable power pack.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an open top container of the type including a bottom wall and generally cylindrical upstanding side walls, a stirring appartus for said container comprising generally horizontally disposed support means removably supported from at least one upper portion of said upstanding side walls and projecting inwardly therefrom, an upright support shaft, means journalling said shaft from said support means for rotation about an axis passing through the approximate center of said bottom wall with said shaft projecting below said support means, the lower end portion of said shaft projecting below said support means including an elongated laterally projecting and generally horizontal arm portion adapted to be disposed above the level of material in said container to be mixed, an upstanding panel-like mixer paddle assembly, means mounting said paddle assembly from said arm portion for adjustable positioning therealong and with said assembly extending generally radially of said axis, the outer and lower peripheral edge portions of the paddle assembly generally conforming to the contour of said side and bottom walls and being positioned closely adjacent the last-mentioned walls for swinging movement relative thereto in close relation therewith upon rotation of said support shaft, said lower peripheral edge portion extending inwardly toward the center of said container from said outer peripheral edge portion a distance greater than the radius of the bottom wall of said container, said means journalling said support shaft from said support means including means for laterally shifting the axis of rotation of said shaft generally radially of said container.

2. The combination of claim 1 wherein said paddle assembly includes an open frame disposed in a plane extending generally radially of said axis of rotation, said frame including a plurality of vertically spaced generally horizontally disposed mixing members generally paralleling said plane.

3. In combination with an open top container of the type including a bottom wall and generally cylindrical upstanding side walls, a stirring apparatus for said container comprising generally horizontally disposed support means removably supported from at least one upper portion of said upstanding side walls and projecting inwardly therefrom, an upright support shaft, means journalling said shaft from said support means for rotation about an axis passing through the approximate center of said bottom wall with said shaft projecting below said support means, an upstanding panel-like mixer blade assembly, means mounting said blade assembly from said support shaft with at least portions of said assembly extending generally radially of said axis, the outer and lower peripheral edge portions of the blade assembly generally conforming to the contour of said side and bottom walls and being positioned closely adjacent the last-mentioned walls for swinging movement relative thereto in close relation therewith upon rotation of said support shaft, said blade assembly including an open frame disposed in a plane extending generally radially of said axis of rotation, said frame including a lower marginal edge portion defined by a plurality of short depending blade elements horizontally spaced apart and angularly disposed relative to said plane.

4. The combination of claim 3 wherein said blade elements generally parallel each other.

5. The combination of claim 4 wherein said blade elements are formed of stiff but resilient material.

6. A container stirring apparatus for securement to the top portion of an open top receptacle of the type including a bottom wall and generally cylindrical side walls, said stirring apparatus comprising elongated support means adapted at one end for releasable securement to said top portion with said support member extending generally radially of said receptacle, an upright support shaft, means journaling said shaft from said support means for rotation about an upstanding axis with said shaft projecting below said support means, the lower end portion of said shaft projecting below said support means including an elongated laterally projecting and generally horizontal arm portion adapted to be disposed above the level of material in said container to be mixed, an upstanding panel-like mixer paddle assembly, means mounting said paddle assembly from said arm portion for adjustable positioning therealong and with said assembly extending generally radially of said axis, the outer and lower peripheral edge portions of said paddle assembly being adapted to generally conform to the contour of said side and bottom walls, said lower peripheral edge portion being of a length adapted to be greater than the radius of the bottom wall of an associated container, said means journalling said support shaft from said support means including means for shifting the axis of rotation of said shaft longitudinally of said support means.

7. A container stirring apparatus for securement to the top portion of an open top receptacle of the type including a bottom wall and generally cylindrical side walls, said stirring apparatus comprising elongated support means adapted at one end for releasable securement to said top portion with said support member extending generally radially of said receptacle, an upright support shaft, means journalling said shaft from said support means for rotation about an upstanding axis with said shaft projecting below said support means, an upstanding panel-like mixer blade assembly, means mounting said blade assembly from said support shaft with at least portions of said assembly extending generally radially of said axis, the outer and lower peripheral edge portions of said blade assembly generally conforming to the contour of said side and bottom walls and being positioned closely adjacent the last-mentioned walls for swinging movement relative thereto in close relation therewith upon rotation of said support shaft, said blade assembly including an open frame disposed in a plane extending generally radially of said axis of rotation, said frame including a lower marginal edge portion defined by a plurality of short depending blade elements horizontally spaced apart and angularly disposed relative to said plane.

8. The combination of claim 6 including motor means supported from said support means and drivingly connected to said shaft.

References Cited by the Examiner

UNITED STATES PATENTS

| | | | |
|---|---|---|---|
| 817,400 | 4/1906 | Stanley | 259—108 |
| 2,572,375 | 10/1951 | Oertli | 259—108 |

FOREIGN PATENTS 491,618   3/1953   Canada.

WALTER A. SCHEEL, *Primary Examiner.*

ROBERT W. JENKINS, *Assistant Examiner.*